United States Patent [19]

Toney

[11] 4,420,786
[45] Dec. 13, 1983

[54] POLARITY GUARD CIRCUIT

[75] Inventor: John J. Toney, Scottsdale, Ariz.

[73] Assignee: Motorola, Inc., Schaumburg, Ill.

[21] Appl. No.: 322,055

[22] Filed: Nov. 16, 1981

[51] Int. Cl.$^3$ .............................................. H02H 7/20
[52] U.S. Cl. ..................................... 361/77; 361/246; 307/127; 307/200 A; 320/25
[58] Field of Search ..................... 361/77, 76, 246, 88; 307/127, 200 A; 191/2, 14; 320/25, 26; 357/35, 48, 51

[56] References Cited

U.S. PATENT DOCUMENTS

| | | | |
|---|---|---|---|
| 3,593,101 | 7/1971 | Emmasingel | 320/25 |
| 3,819,951 | 6/1974 | Moore | 361/77 |
| 4,034,168 | 7/1977 | Brown | 361/77 X |
| 4,139,880 | 2/1979 | Ulmer et al. | 307/127 X |

OTHER PUBLICATIONS

Wireless World, vol. 84, p. 1507, (Mar. 1978), "Cross Coupled Transistor Bridge".
Measurement Techniques, vol. 18, No. 6, p. 873, (Jun. 1975), FIG. 2, "Linear Rectifier for Small Signals".

Primary Examiner—Patrick R. Salce
Attorney, Agent, or Firm—William E. Koch

[57] ABSTRACT

Four bipolar transistors are arranged in a bridge configuration and are interconnected with two additional bipolar transistors to provide an efficient polarity guard circuit. The circuit has two output terminals, one of which has a positive polarity regardless of the polarity across two input terminals. The two additional transistors prevent collector to base current from flowing through any of the bridge transistors which may be biased off.

3 Claims, 1 Drawing Figure

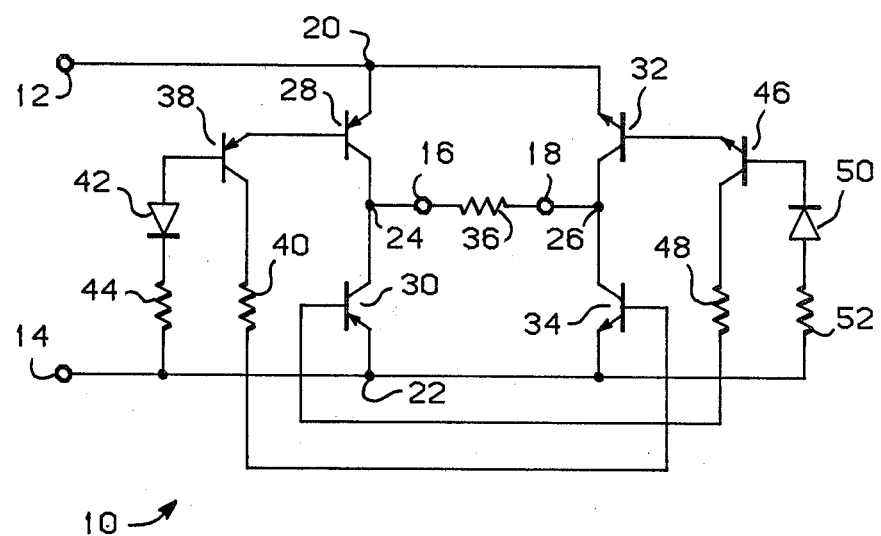

POLARITY GUARD CIRCUIT

BACKGROUND OF THE INVENTION

1. Field of the Invention:

This invention relates to bipolar circuits and more particularly to a bipolar polarity guard circuit.

2. Prior Art:

Electronic instruments and circuits exist that require the application of an external power source. In many instances, the instrument or circuit may be damaged if the polarity of the voltage from the external power source is applied in the reverse direction. For example, the circuitry in a telephone using electronics such as touch tone generators, tone ringers, or speech networks, require a unipolar voltage supply. The twisted wires supplying the voltage to the telephone may be improperly connected, thereby failing to supply the required polarity. In order to prevent damage caused by an improper polarity, many polarity guard circuits have been designed that present a positive polarity on the output terminals. The well-known diode bridge accomplishes this objective, but with a comparative high resistance and associated high voltage drop. The circuit disclosed in WIRELESS WORLD, Volume 84, page 1507 (March 1978) and Measurement Techniques, Volume 18, No. 6, page 873 (June 1975) illustrates how four bipolar transistors may be arranged in bridge fashion to insure a positive voltage output. Two PNP transistors and two NPN transistors, forming two current paths, have their bases coupled to the input terminals to sense the input polarity, thereby determining which of the paths will apply the desired output polarity. U.S. Pat. No. 4,034,168 uses four PNP transistors, along with several resistors, capacitors and coils for achieving the desired output polarity.

The bipolar circuits of the prior art are inefficient in that an additional current path is formed through the transistors that are biased off. All bipolar transistors have internal diodes from collector to base and emitter to base. Normally, these internal diodes are reverse biased and present no problem. However, for the transistors of the prior art bridges, that are biased off, the collector to base diodes are forward biased and allow current to pass back to the source. This collector to base current path reduces the efficiency of the circuit.

Thus the need exists for a more efficient bipolar polarity guard circuit that prevents current from leaking through any transistor that is biased off.

SUMMARY OF THE INVENTION

Accordingly, it is an object of this invention to provide an improved polarity guard circuit.

Another object of this invention is to provide a polarity guard circuit that eliminates the undesired collector to base current path through transistors that are biased off.

In carrying out the above and other objects of the invention in one form, there is provided an improved polarity guard circuit having first and second input terminals and first and second output terminals. Two NPN transistors and two PNP transistors are arranged in a standard four-sided bridge configuration forming two paths between the input terminals and the output terminals. A third NPN transistor is coupled between the bases of the transistors in one path and a third PNP transistor is coupled between the bases of the transistors in the second path. The bases of the third NPN transistor and the third PNP transistor are biased by the input voltage; therefore, the polarity of the input voltage determines which path is utilized and thereby provides a positive polarity on the output terminals.

The above and other objects, features and advantages of the present invention will be better understood from the following detailed description taken in conjunction with the accompanying drawings.

BRIEF DESCRIPTION OF THE DRAWINGS

The single FIGURE is a schematic of the preferred embodiment of the invention.

DETAILED DESCRIPTION OF THE INVENTION

The FIGURE illustrates in schematic form a low voltage polarity guard circuit 10 having input terminals 12 and 14 and output terminals 16 and 18. The polarity of output terminal 16 will always be positive relative to output terminal 18 regardless of the polarity on input terminals 12 and 14. Input terminals 12 and 14 are connected to nodes 20 and 22, respectively, and output terminals 16 and 18 are connected to nodes 24 and 26, respectively.

The emitters of transistors 28 and 30 are connected to nodes 20 and 22 respectively, while the collectors thereof are connected to node 24. The emitters of transistors 32 and 34 are also connected to nodes 20 and 22, respectively, while the collectors thereof are connected to node 26. Resistor 36 represents the resistance of a load and is shown coupled between output terminals 16 and 18. Transistor 28, resistor 36, and transistor 34 comprise the current path when input terminal 12 is positive with respect to input terminal 14, and transistor 30, resistor 36, and transistor 32 comprise the current path when input terminal 14 is positive with respect to input terminal 12.

The emitter of transistor 38 is connected to the base of transistor 28. Resistor 40 is coupled between the collector of transistor 38 and the base of transistor 34. The base of transistor 38 is connected to the anode of diode 42. Resistor 44 is coupled between the cathode of diode 42 and node 22. The emitter of transistor 46 is connected to the base of transistor 32. Resistor 48 is coupled between the collector of transistor 46 and the base of transistor 30. The base of transistor 46 is connected to the cathode of diode 50. Resistor 52 is coupled between the anode of diode 50 and node 22. Transistors 38 and 46, while functioning as a switch to enable transistors 28, 30, 32, 34, further function as a leakage current blocking device for the two transistors not involved in the current path as determined by the polarity of input terminals 12 and 14. For example, when input terminal 12 is positive with respect to input terminal 14, the current path comprises transistor 28, resistor 36, and transistor 34. Transistor 46 is biased off, preventing any current from passing across the collector to base junction of transistor 32 to a low voltage input terminal.

When the input voltage applied to input terminal 12 is positive with respect to input terminal 14, the emitters of PNP transistors 28 and 38 are positive with respect to their bases, therefore, transistors 28 and 38 are biased on. Since transistor 28 is on, input terminal 12 is coupled thereby to output terminal 16. A positive voltage from transistor 38 is applied to the base of NPN transistor 34, biasing it on and thereby coupling input terminal 14 to output terminal 18. Since a negative voltage appears on the bases of NPN transistors 32 and 46 and a negative voltage is applied to the emitter of PNP transistor 30, they are biased off. Since transistor 46 is biased off, the emitter-base PN junction thereof is reverse biased. This prevents any current from leaking across the collector to base junction of transistor 32 back to a low voltage input terminal, thereby increasing the efficiency of the circuit 10.

If, in the alternative, the input voltage applied to input terminal 14 is positive with respect to input terminal 12, the emitter of PNP transistor 30 is positive with respect to its base and is biased on, thereby coupling input terminal 14 to output terminal 16. The positive voltage on input terminal 14 further turns on transistor 46, allowing the emitter to base current of transistor 30 to pass to the base of transistor 32. Thus, transistor 32 is biased on, coupling input terminal 12 to output terminal 18. Transistors 28, 32, 38 are biased off. The reverse biased emitter to base PN junction of transistor 38 serves to block any current from leaking across the collector to base junction of transistor 28, thereby increasing the efficiency of the circuit 10 over the prior art. In view of the preceding discussion, it will be appreciated that regardless of the polarity of the voltage applied to the input terminals 12 and 14 of polarity guard circuit 10, the polarity of the voltage appearing at output terminals 16 and 18 will always be the same.

Diodes 42 and 50 are included in the circuit to prevent damage to the transistors 28, 34, 38 and 30, 32, 46 respectively in case a high voltage appears across input terminals 12 and 14, by providing a current path through high value resistors 44 and 52.

Consequently, while in accordance with the Patent Statutes, there has been described what at present is considered to be the preferred form of the invention. It will be obvious to those skilled in the art that numerous changes and modifications may be made herein without departing from the spirit and scope of the invention, and it is therefore aimed that the following claims cover all such modifications.

I claim:

1. A polarity guard circuit for providing an output voltage having a positive polarity regardless of the polarity of an input voltage, said circuit comprising:
   a first and a second input terminal receiving said input voltage;
   a first and a second output terminal;
   a first transistor having a base, collector and emitter, coupled between said first input terminal and said first output terminal;
   a second transistor having a base, collector and emitter, coupled between said first input terminal and said second output terminal;
   a third transistor having a base, collector and emitter, coupled between said second input terminal and said first output terminal;
   a fourth transistor having a base, collector and emitter, coupled between said second input terminal and said second output terminal;
   a fifth transistor having a base, collector and emitter, coupled between the bases of said first transistor and said fourth transistor, the base of said fifth transistor coupled to one of said input terminals; and
   a sixth transistor having a base, collector and emitter, coupled between the bases of said second transistor and said third transistor, the base of said sixth transistor coupled to one of said input terminals.

2. A polarity guard circuit having a first and second input terminal and a first and second output terminal, said circuit comprising:
   a first PNP transistor, having a base, collector and emitter, said emitter thereof coupled to said first input terminal;
   a first NPN transistor, having a base, collector and emitter, said emitter thereof coupled to said first input terminal, said collector of said first PNP transistor coupled to said first output terminal and said collector of said first NPN transistor coupled to said second output terminal;
   a second PNP transistor, having a base, collector and emitter, said emitter thereof coupled to said second input terminal;
   a second NPN transistor, having a base, collector and emitter, said emitter thereof coupled to said second input terminal, said collector of said second PNP transistor coupled to said first output terminal and said collector of said second NPN transistor coupled to said second output terminal;
   a third PNP transistor, having a base, collector and emitter, said emitter thereof coupled to said base of said first PNP transistor, said collector thereof coupled to said base of said second NPN transistor, said base thereof coupled to said second input terminal; and
   a third NPN transistor, having a base, collector and emitter, said emitter thereof coupled to said base of said first NPN transistor, said collector thereof coupled to said base of said second PNP transistor, said base thereof coupled to said second input terminal.

3. The circuit according to claim 2 further comprising:
   a first diode having an anode and a cathode, said anode coupled to said base of said third PNP transistor and said cathode coupled to said second input terminal; and
   a second diode having an anode and a cathode, said cathode coupled to said base of said third NPN transistor and said anode coupled to said second input terminal, said first and second diodes being so positioned to block a substantially large current resulting from a substantially high voltage across said first and second input terminals.

* * * * *